Nov. 22, 1949    R. T. AXE    2,488,654
BEARING MOUNTING
Filed Aug. 22, 1946    3 Sheets-Sheet 1
Fig. 1
Fig. 2
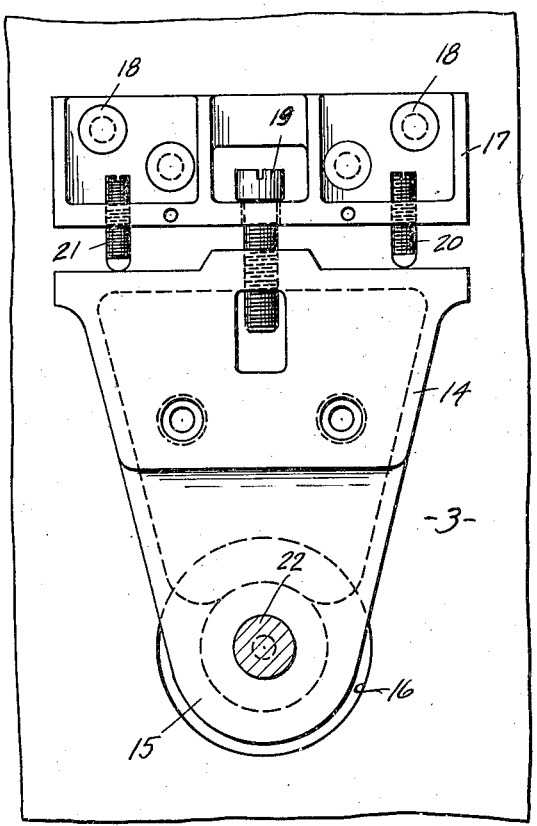
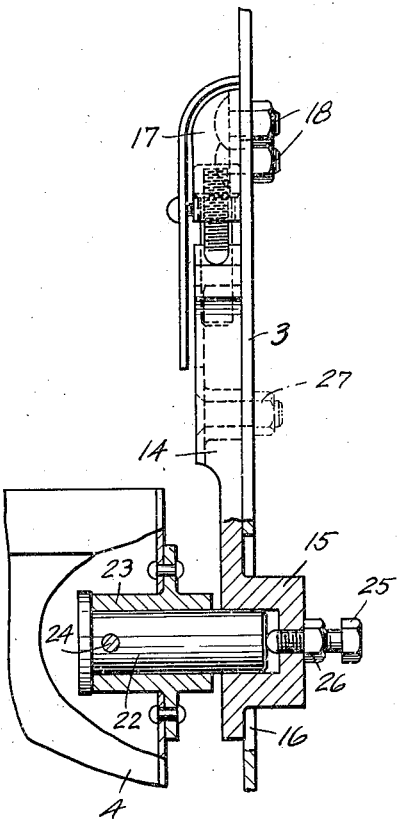
INVENTOR:
Roy T. Axe,
BY
Bodell & Thompson
ATTORNEYS.

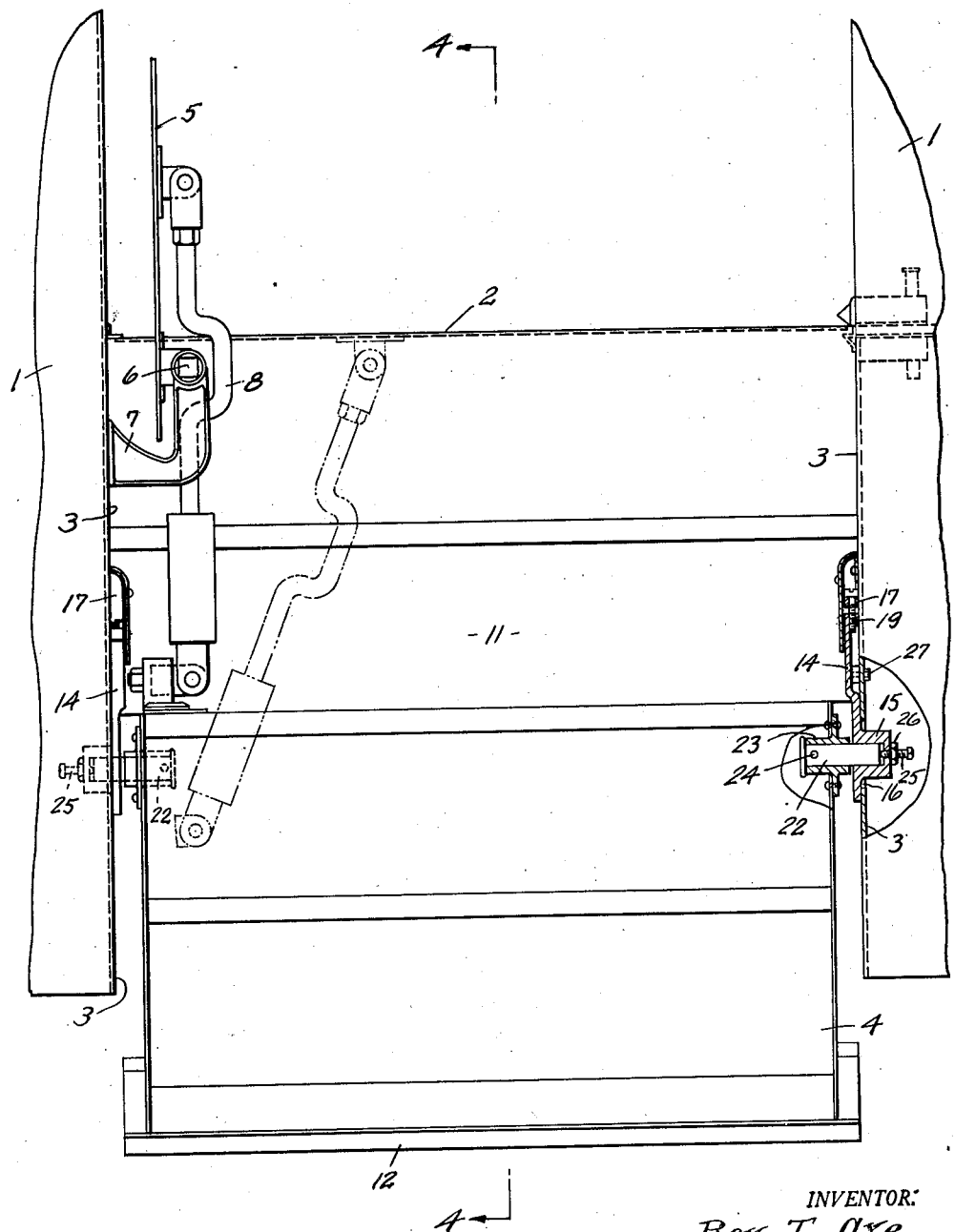

Nov. 22, 1949     R. T. AXE     2,488,654
BEARING MOUNTING
Filed Aug. 22, 1946     3 Sheets-Sheet 3
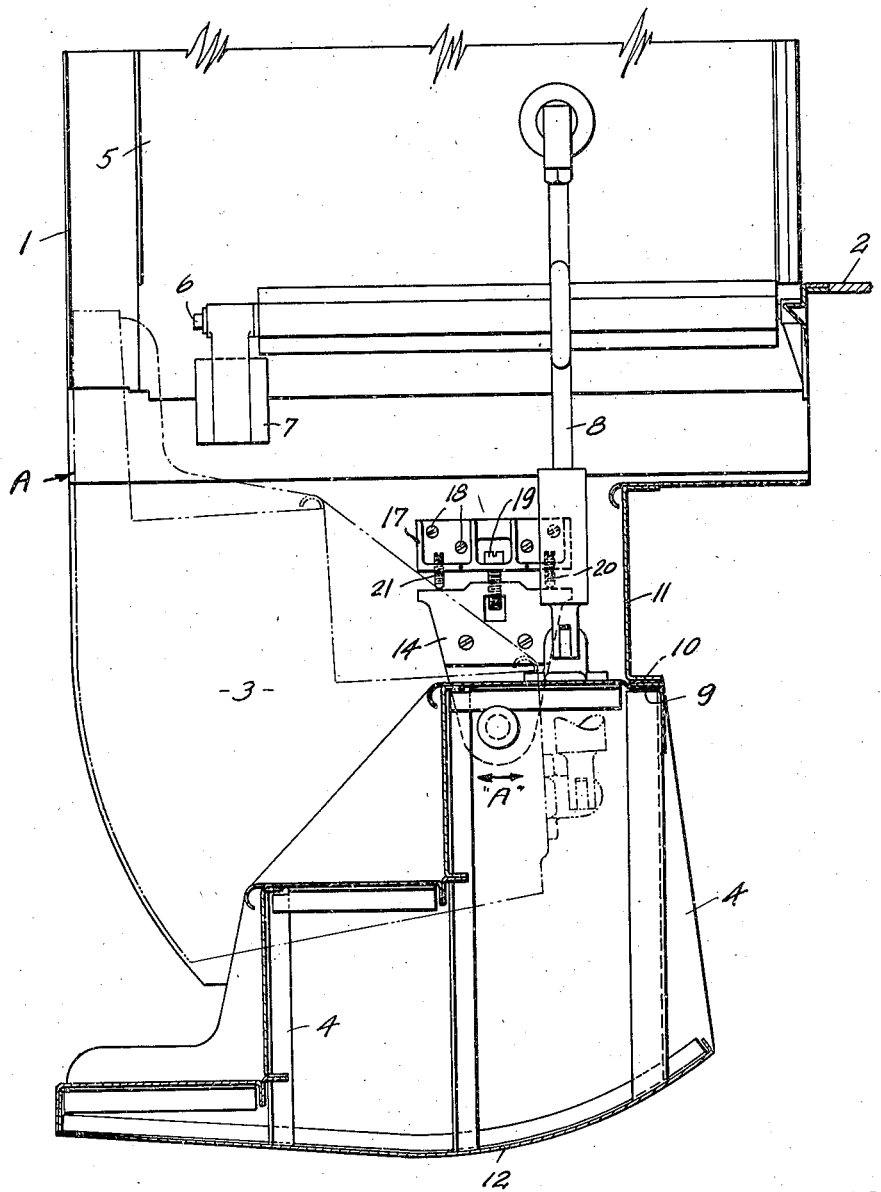
INVENTOR:
Roy T. Axe,
BY
Bodell & Thompson
ATTORNEYS.

Patented Nov. 22, 1949

2,488,654

UNITED STATES PATENT OFFICE 2,488,654

BEARING MOUNTING

Roy T. Axe, Jordan, N. Y., assignor to The O. M. Edwards Company, Inc., Syracuse, N. Y., a corporation of New York Application August 22, 1946, Serial No. 692,167

1 Claim. (Cl. 308—32)

This invention relates to car vestibule trap door and folding step construction of the type shown in Axe Patent No. 2,148,522 issued February 28, 1939 and has for its object a mounting for the folding step unit by which the step unit may be applied to the well in the vestibule platform of the car and adjusted axially of its tilting or folding axis as up and down and in and out or radially forward and rearward, relatively to the axis of its folding movement, in order to bring about the proper centering and leveling and alinement of the step unit relatively to the well, the platform and the outer streamlining of the car.

Railway cars are constructed by the car builder and certain equipment as the trap door and folding step equipment comes from a supplier of special equipment on order and is assembled by the car builder into the car structure. The car structure involves wells in the vestibule platform for the steps, and these wells are covered when the steps are folded by trap doors. The opening of the trap doors unfolds or extends the steps into operative position; the closing of the trap door folds up the steps. The steps and trap door equipment are of the type shown in the patent referred to, or of the type that turn as a unit about a horizontal axis from closed position to open position, the turning being effected by a connecting rod between the steps and the trap door. When the steps are unfolded, they must fit accurately along the upper edge against the under side of the floor of the platform, so as to be firm and not rickety or infirm when a passenger steps on them. The reverse or outer side of the step unit, that is, the side opposite that on which the flight of steps is located is covered by a curved wall which conforms to the curvature or stream-lining of the car. When the steps are assembled, the outer wall of the step unit should be substantially flush with the contiguous outer walls of the car body. As there are unavoidable variations in the car structures, numerous adjustments are necessary to make standard folding step equipment fit accurately in the different wells of the vestibule platforms of car bodies.

The object of this invention is a mounting for the step unit by which all of the adjustments are readily made, so that the standard folding step equipment furnished by the equipment supplier may be readily and accurately adapted by the car builder to the variations in vestibule and platform construction of the cars.

The invention consists in the novel features and in the combinations and constructions hereinafter set forth and claimed.

In describing this invention, reference is had to the accompanying drawings, in which like characters designate corresponding parts in all the views.

Figure 1 is an elevation of this trap door mounting, the contiguous portion of the side finishing plate of the well being shown as partly broken away.

Figure 2 is a side view of the parts shown in Figure 1, partly in section.

Figure 3 is a front elevation, partly in section, of the steps, when unfolded or opened partly broken away to show one of the mountings therefor, the trap door which operates the steps and contiguous portions of the car body being also shown in Figure 3.

Figure 4 is a sectional view taken on the plane of line 4—4, Figure 3.

This mounting for folding, car-vestibule-step units comprises a pair of bearing plates mountable on the finishing side plates of the well of the vestibule platform, each bearing plate having an adjustment forward and rearward and upward and downward relatively to the folding axis of the step unit, or in a general way, radially to the axis of the folding step unit, the bearing plates also having means for thrusting the step unit axially to adjust the step unit axially, all so that the step unit fits squarely in, and is centered in, the step well of the platform of the car, and also the outer wall of the step unit is substantially flush with the stream-lining of the outer walls of the car when the steps are folded up or closed.

I designates the framing of the car body at the vestibule platform of a railway car. 2 indicates the floor of the platform. 3 designates the side finishing plates of the step well. 4 designates the step unit, and 5 the trap door, which is hinged at 6 to a bracket 7 carried by the framing of the car. 8 is the connecting rod between the trap door and the step unit, this being generally the same as in the patent referred to. The step unit is mounted to swing about a horizontal axis into and out of folded position, the open position being shown in Figure 3. When in open position, the rear margin 9 of the tread of the top step must press evenly against a surface at 10 here shown in this embodiment of the invention, as at the lower edge of a step riser 11, which is part of the floor of the platform. If the surfaces 9, 10 are not firmly flatwise against each other, the step unit will give an insecure feeling to the passengers boarding and alighting from the car. If, during the adjustment, these surfaces 9, 10 do not come flatwise against each other, adjusting members or leveling screws are provided, as in Chaffee Patent No. 2,124,872 issued July 26, 1938. The step unit is provided with an outer or undercurved wall 12 which conforms to the curvature of the stream-lining of the car body when in closed position.

14 designates the mounting plates for the step unit, these being mounted on opposite sides of the unit on the finishing plates 3 and being initially adjustable radially in all directions relatively to the axis of the steps. The steps themselves are adjustable axially, as a unit, by means carried by these plates. Each of these plates has means for initially securing them to the side finishing plates 3 by means which permit them to be shifted vertically and forwardly and rearwardly in order to shift the bearings in which trunnions for the steps are mounted radially. The plates are provided with hubs or bearings 15 for entering holes 16 formed in the finishing plates 3, these holes being large enough to permit radial adjustment in all directions within the necessary limits. Each of the bearing plates 14 is initially supported and located by a bracket 17 which is located above the opening 16 and secured to the adjacent side finishing plate 3, as by fastening members or screws 18. As here shown, each bearing plate is suspended from its bracket 17 so as to be swung forward and rearward and thereby move the lower end in which the bearing 15 is located forward or rearward or to the right or left in Figure 4. It is also shown as suspended from the bracket by a screw 19 extending loosely through a hole in the bracket large enough to permit the screw to swing. The screw is threaded into the upper end of the plate 14. Obviously, by turning the screw 19 in one direction or the other, the plate 14 and hence the bearing 15 will be raised or lowered. The plate may be swung forward or rearward or to the right and left and held in such position by screws 20 and 21 threading through the bracket parallel to the screw 19 and on opposite sides thereof, these screws thrusting against the upper edge of the bracket 14. Thus, by screwing one of the screws 20 or 21 and unscrewing the other, the bearing plate will be tilted in one direction or the other, as illustrated by the arrows A, thus shifting the bearing 15 radially to the right or left (Figure 1). A resultant of the two adjustments by the screw 19 and the screws 20 and 21 is a radial adjustment in any direction.

The step unit is supported by these plates by means of trunnions 22 carried in suitable hubs 23 mounted in the side plates of the step unit and journalled in the hubs 15. These trunnions are pressed in position in their hubs and in the bearings, and then secured therein, as by keys or pins 24. These keys hold the trunnions from axial shifting relatively to the hubs 23 in which they are mounted. In order to center accurately the step unit in the well opening between the finishing walls 3, the step unit is adjustable in an axial direction by means carried by the bearing plates and acting axially on the outer ends of the trunnions. This means is here shown as a set screw 25 threading axially into each bearing 15 and thrusting against the end of each axle and held in its adjusted position by lock nut 26. Thus by screwing in either set screw 25 and correspondingly unscrewing of the other, the step unit may be shifted axially. After each bearing plate 14 has been adjusted, as described, it is permanently held in position to the side finishing plates 3, as by screws 27 threading through each plate 14 into the adjacent finishing side plate 3. If the steps get out of adjustment, as when the car is subjected to unusual strains, when in an accident, these screws 27 may be removed and readjustment of the step unit made. A plate C normally covers the upper part of the mounting.

By this mounting, the steps may be adjusted so that the walls 13 are finally substantially flush, when the steps are closed, with the side walls of the car, this being illustrated at A (Figure 4), where a maladjustment of the step unit may result in the walls 13 being far out of the stream lines of the car body. The illustration at A is on a small scale and evidently the misalinement would be considerably greater in actual practice. By this mounting, the folding step and trap door equipment supplied by the equipment maker as a unit, may be accurately and quickly installed and adjusted by the mechanics in the car shops, to the vestibule platform and wells of the cars.

What I claim is:

An adjustable bearing mounting including a plate having a bearing opening therein, a fixed support for the plate, means for suspending the plate from the support in a line passing through the point of suspension and the axis of the bearing opening to permit lateral movement of the plate to adjust the bearing radially, set screws carried by the support and coacting with the plate on opposite sides of the suspension means for holding the plate in its adjusted position, the suspension means being a screw operable to shift the plate toward and from the support.

ROY T. AXE.

REFERENCES CITED

The following references are of record in the file of this patent:

UNITED STATES PATENTS

| Number | Name | Date |
| --- | --- | --- |
| 433,779 | Fisher et al. | Aug. 5, 1890 |
| 857,528 | Manahan | June 18, 1907 |
| 2,124,872 | Chaffee | July 26, 1938 |
| 2,148,522 | Axe | Feb. 28, 1939 |
| 2,162,964 | Nichols | June 20, 1939 |